United States Patent
Fuchs et al.

(10) Patent No.: US 7,657,108 B2
(45) Date of Patent: Feb. 2, 2010

(54) ENCODING OF DIGITAL DATA COMBINING A PLURALITY OF ENCODING MODES

(75) Inventors: Guillaume Fuchs, Ergue Gaberic (FR); Félix Henry, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 10/700,691

(22) Filed: Nov. 5, 2003

(65) Prior Publication Data

US 2005/0053299 A1  Mar. 10, 2005

(30) Foreign Application Priority Data

Nov. 5, 2002  (FR) .................................. 02 13821

(51) Int. Cl.
| G06K 9/46 | (2006.01) |
| G06K 9/00 | (2006.01) |
| H04N 1/41 | (2006.01) |
| H04N 7/12 | (2006.01) |
| H04N 11/02 | (2006.01) |
| H04N 11/04 | (2006.01) |

(52) U.S. Cl. .................. 382/239; 382/232; 382/246; 382/250; 382/251; 358/426.14; 348/395.1

(58) Field of Classification Search ................. 382/232, 382/239
See application file for complete search history.

(56) References Cited

U.S. PATENT DOCUMENTS

| 5,329,379 | A | * | 7/1994 | Rodriguez et al. | .......... 382/167 |
| 5,414,527 | A | * | 5/1995 | Koshi et al. | .................. 382/239 |
| 5,563,961 | A | * | 10/1996 | Rynderman et al. | ......... 382/239 |
| 5,650,860 | A | * | 7/1997 | Uz | .............................. 382/253 |
| 5,818,974 | A | * | 10/1998 | Kimura et al. | .............. 382/270 |
| 5,848,192 | A | * | 12/1998 | Smith et al. | ................. 382/232 |
| 5,978,517 | A | | 11/1999 | Henry et al. | ................. 382/253 |
| 5,995,027 | A | | 11/1999 | Henry | .......................... 341/50 |
| 6,031,939 | A | | 2/2000 | Gilbert et al. | ................ 382/239 |
| 6,072,909 | A | * | 6/2000 | Yokose et al. | ................ 382/247 |

(Continued)

FOREIGN PATENT DOCUMENTS

EP  0734173  9/1996

(Continued)

OTHER PUBLICATIONS

E. Reusens et al., "New Techniques For Subband/Wavelet Transform Coefficient Coding Applied To Still Image Compression", Proceedings of the SPIE, Bellingham, VA, US, SPIE vol. 1771 Applications of Digital Image Processing XV, Jul. 21, 1992, pp. 444-457.

*Primary Examiner*—Andrew W Johns
*Assistant Examiner*—Jose M Torres
(74) *Attorney, Agent, or Firm*—Fitzpatrick, Cella, Harper & Scinto

(57) ABSTRACT

A method of encoding a set of data representing physical quantities includes the steps of dividing the set of data into subsets, calculating a first encoding cost for each subset using a first encoding mode, calculating a second encoding cost for each subset using a second encoding mode, and selecting an encoding mode per subset as a function of the first and second encoding costs, in which the two encoding costs are calculated according to the same rate-distortion compromise ($\lambda$), for the image overall.

27 Claims, 7 Drawing Sheets

U.S. PATENT DOCUMENTS

| | | | |
|---|---|---|---|
| 6,198,850 B1 * | 3/2001 | Banton | 382/239 |
| 6,215,422 B1 | 4/2001 | Henry et al. | 341/51 |
| 6,333,705 B1 | 12/2001 | Amonou et al. | 341/107 |
| 6,356,668 B1 | 3/2002 | Honsinger et al. | 382/251 |
| 6,445,312 B1 * | 9/2002 | Nguyen | 341/50 |
| 6,498,866 B2 | 12/2002 | Charrier et al. | 382/248 |
| 6,501,860 B1 * | 12/2002 | Charrier et al. | 382/240 |
| 6,625,321 B1 * | 9/2003 | Li et al. | 382/239 |
| 6,631,213 B1 | 10/2003 | Amonou et al. | 382/232 |
| 6,731,814 B2 * | 5/2004 | Zeck et al. | 382/239 |
| 6,795,584 B2 * | 9/2004 | Karczewicz et al. | 382/239 |
| 6,822,587 B2 | 11/2004 | Henry | 341/50 |
| 6,832,006 B2 * | 12/2004 | Savakis et al. | 382/239 |
| 6,985,632 B2 * | 1/2006 | Sato et al. | 382/240 |
| 7,003,167 B2 * | 2/2006 | Mukherjee | 382/239 |
| 2002/0015530 A1 | 2/2002 | Henry et al. | 382/233 |
| 2002/0054644 A1 | 5/2002 | Henry et al. | 375/240.27 |
| 2003/0063804 A1 | 4/2003 | Henry | 382/232 |
| 2003/0154173 A1 | 8/2003 | Henry | 705/400 |

FOREIGN PATENT DOCUMENTS

| | | |
|---|---|---|
| WO | WO 97/15146 | 4/1997 |
| WO | WO 01/56298 | 8/2001 |

* cited by examiner

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

*Figure 6*

ENCODING OF DIGITAL DATA COMBINING A PLURALITY OF ENCODING MODES

BACKGROUND OF THE INVENTION

1. Field of the Invention

The present invention generally relates to digital signal encoding and for this purpose provides a method and a device for encoding a digital signal. It also relates to a method and device corresponding to the encoding method and device.

The object of the encoding is to compress the signal, which makes it possible respectively to transmit the digital signal and to store it in memory while reducing the transmission time, or the transmission rate respectively, by reducing the space in memory that is used.

The invention is in the field of lossy compression of digital signals. The digital signals considered here are of any type, for example fixed images, video, sound, or computer data.

In what follows, the encoding and decoding of a fixed image will more particularly be considered.

2. Description of the Related Art

It is known to use a plurality of encoding modes to encode the same image. For example, blocks are formed in the image and a block is encoded according to the encoding mode which provides the best rate-distortion compromise.

However, each encoding mode has its own parameters, and it is difficult to obtain the same rate-distortion compromise with two different encoding modes for the same image.

SUMMARY OF THE INVENTION

The object of the present invention is to remedy the drawbacks of the prior art, by providing a method and device which make it possible to compare the performance of a plurality of encoding modes on a part or component of the image.

To that end, the invention provides a method of encoding a set of data representing physical quantities, comprising the steps of:

dividing the set of data into subsets, calculating a first encoding cost for each subset using a first encoding mode, calculating a second encoding cost for each subset using a second encoding mode, selecting an encoding mode per subset as a function of the first and second encoding costs, characterized in that the two encoding costs are calculated according to the same rate-distortion compromise, for the image overall.

The image makes it possible to obtain the same rate-distortion compromise with two different encoding modes for the same set of data. Thus, the two encoding modes can be made to compete over the subsets of data.

According to a preferred feature, the first encoding mode is an encoding according to which the data are encoded by an amplitude curve and a path through the data. This type of encoding generally achieves a low encoding cost.

According to a preferred feature, the second encoding mode is an encoding mode according to the JPEG standard. This encoding mode is greatly used for images.

According to a preferred feature, in the case of an encoding according to the JPEG standard, a multiplication coefficient of the quantization matrix is optimized so that it corresponds to the desired rate-distortion compromise.

According to another preferred feature, the second encoding mode is an encoding mode according to the JPEG2000 standard. This encoding mode is also widespread for encoding images.

According to a preferred feature, in the case of an encoding according to the JPEG2000 standard, the rate is optimized so that it corresponds to the desired rate-distortion compromise.

According to a preferred feature, the data are a digital image.

According to a preferred feature, the subsets are blocks formed in the image.

According to a preferred feature, the subsets are components of colors or of luminance and chrominance.

In a complementary manner, the invention relates to a device for encoding a set of data representing physical quantities, comprising:

means for dividing the set of data into subsets, means for calculating a first encoding cost for each subset using a first encoding mode, means for calculating a second encoding cost for each subset using a second encoding mode, means for selecting an encoding mode per subset as a function of the first and second encoding costs, characterized in that the means for calculating the two encoding costs are adapted to calculate them according to the same rate-distortion compromise, for the image overall.

The encoding device according to the invention comprises means for implementing the preceding features and has similar advantages to those already presented.

The invention also relates to a digital apparatus including the device according to the invention or means for implementing the method according to the invention. This digital apparatus is for example a digital camera, a digital camcorder, a scanner, a printer, a photocopier, or a fax machine. The advantages of the device and of the digital apparatus are identical to those already set out.

The invention also relates to an information storage means, which can be read by a computer or microprocessor, integrated or not into the device, and possibly removable, storing a program implementing the method according to the invention.

The invention also relates to a computer program readable by a microprocessor and comprising one or more sequences of instructions capable of implementing the methods according to the invention.

BRIEF DESCRIPTION OF THE DRAWINGS

The features and advantages of the present invention will appear more clearly from a reading of a preferred embodiment illustrated by the accompanying drawings, in which:

FIG. 6 represents a quantization table used according to the invention.

DETAILED DESCRIPTION OF THE PREFERRED EMBODIMENTS

Figure 1:
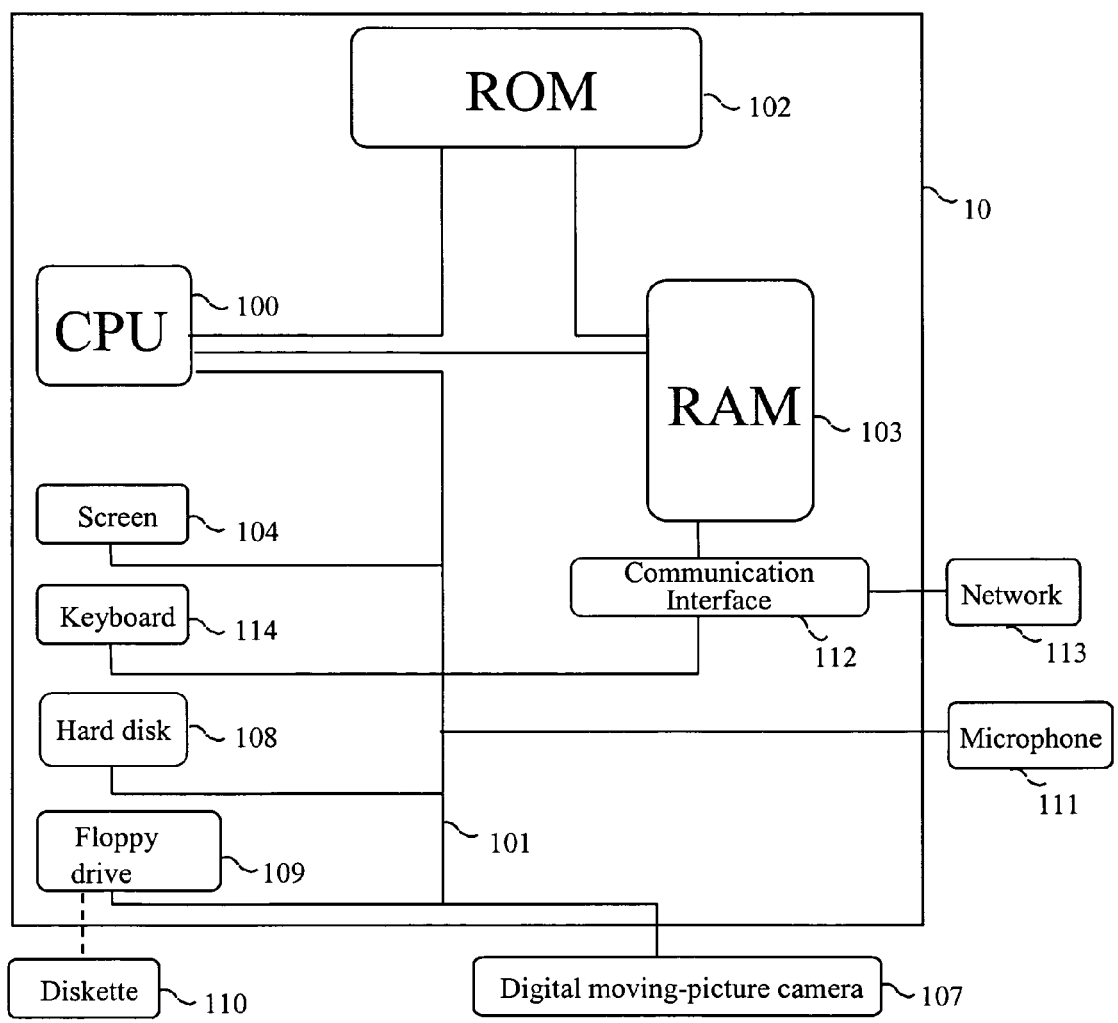
FIG. 1 is an embodiment of a device implementing the invention.

According to the chosen embodiment shown in FIG. 1, a device implementing the invention is for example a microcomputer 10 connected to different peripherals, for example a digital moving picture camera 107 (or a scanner, or any means of acquiring or storing an image) connected to a graphics card and supplying information to be processed according to the invention.

The device 10 comprises a communication interface 112 connected to a network 113 able to transmit digital data to be processed or conversely to transmit data processed by the device. The device 10 also comprises a storage means 108 such as a hard disk. It also comprises a drive 109 for a disk 110. This disk 110 may for example be a diskette, a CD-ROM, or a DVD-ROM. The disk 110 like the hard disk 108 can contain data processed according to the invention as well as the program or programs implementing the invention which, once read by the device 10, will be stored on the hard disk 108. According to a variant, the program enabling the device to implement the invention can be stored in read-only memory 102 (referred to as ROM in the drawing). In a second variant, the program can be received in order to be stored in an identical fashion to that described previously via the communication network 113.

The device 10 is connected to a microphone 111. The data to be processed according to the invention will in this case be audio signal.

This same device has a screen 104 for displaying the data to be processed or serving as an interface with the user, who can thus parameterize certain processing modes, using the keyboard 114 or any other means (a mouse for example).

The central processing unit 100 (referred to as CPU in the drawing) executes the instructions relating to the implementation of the invention, which are stored in the read only memory 102 or in the other storage means. On powering up, the processing programs stored in a non-volatile memory, for example the ROM 102, are transferred into the random access memory RAM 103, which will then contain the executable code of the invention, as well as registers for storing the variables necessary for implementing the invention.

In more general terms, an information storage means, which can be read by a computer or microprocessor, integrated or not into the device, and which may possibly be removable, stores a program implementing the method according to the invention The communication bus 101 affords communication between the different elements included in the microcomputer 10 or connected to it. The representation of the bus 101 is not limiting and, in particular, the central processing unit 100 is able to communicate instructions to any element of the microcomputer 10 directly or by means of another element of the microcomputer 10.

Figure 2:
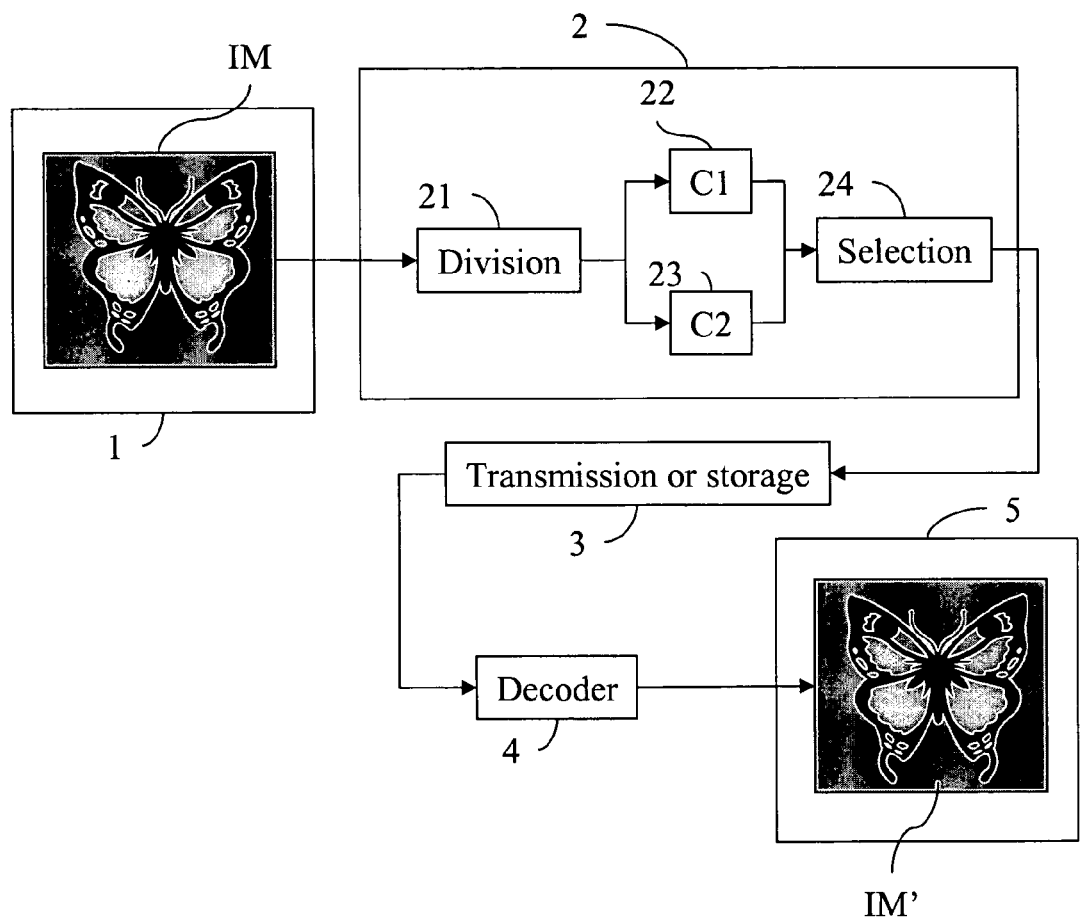
FIG. 2 shows an encoding device according to the invention and a corresponding decoding device.

With reference to FIG. 2, an embodiment of an encoding device 2 according to the invention is adapted to encode a digital signal with the object of compressing it. The encoding device is integrated into an apparatus, which is for example a digital camera, a digital camcorder, a scanner, a printer, a photocopier, a fax machine, a database management system, or a computer.

An image source 1 supplies a digital image IM to the encoding device 2.

The device 2 according to the invention comprises
means 21 for dividing the set of data into subsets,
means 22 for calculating a first encoding cost for each subset using a first encoding mode,
means 23 for calculating a second encoding cost for each subset using a second encoding mode,
means 24 for selecting an encoding mode per subset as a function of the first and second encoding costs.

According to the invention, the means for calculating the two encoding costs are adapted to calculate them according to the same rate-distortion compromise, for the image overall.

The encoding device 2 provides a file containing data representing the compressed image to means for transmission and/or storage 3. These means are conventional and will not be described here.

The encoded image is for example transmitted to a decoding device 4. As a variant, the encoded image is simply stored in memory to be decoded later.

The decoded image IM' is displayed by a display device 5.

Figure 3:
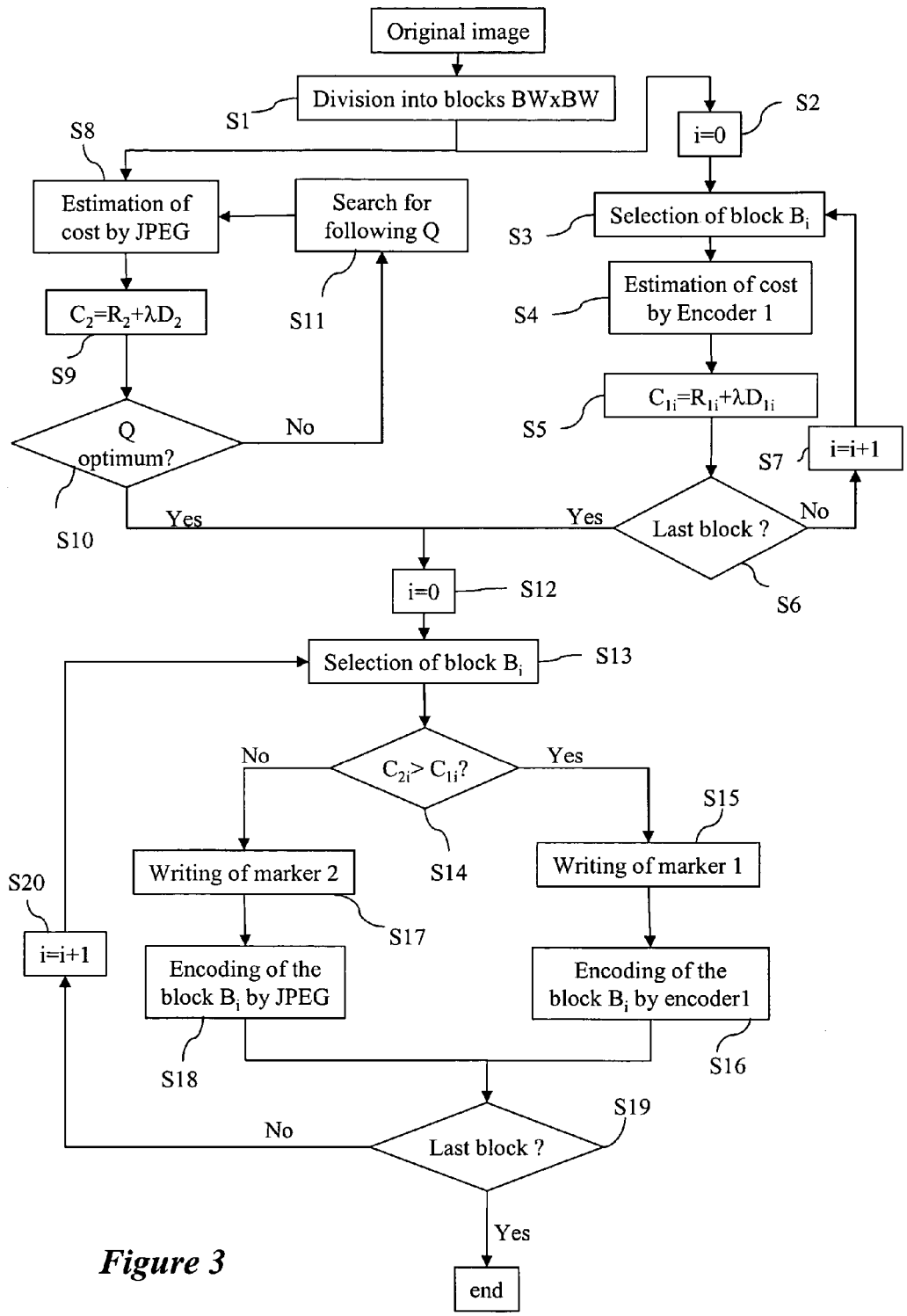
FIG. 3 shows an embodiment of an encoding method according to the invention.

FIG. 3 shows an embodiment of a method of encoding an image, according to the invention. This method is implemented in the encoding device and comprises the steps S1 to S20.

Overall, the method comprises the choice of an encoding mode as a function of an encoding cost, for blocks formed in the image. The encoding costs are expressed as a function of the same rate-distortion compromise, for all the encoding modes.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S1 is the formation of blocks of predetermined size in the image to be encoded. The blocks are adjacent and of square form. Their dimensions are for example multiples of eight.

Steps S2 to S7 concern a first encoding mode.

The following step S2 is an initialization at which a parameter i is set to the value zero. The parameter i is an integer which represents an index of the block.

The following step S3 is the selection of a block $B_i$ of the image. The blocks are all selected one after the other.

The following step S4 is an estimation of the encoding cost for the current block $B_i$ according to a first encoding mode.

A first encoding mode is considered here which uses a path established between a set of digital samples. For example, the French patent applications No. 01 06933 and 01 13922 concern such encoding modes.

Thus, according to this encoding mode, the encoded form of a block comprises an amplitude model which supplies an approximation of the amplitude of the coefficients and a path which supplies an ordered series of the locations of the coefficients. The location of the $k^{th}$ coefficient of this series is determined by the path and its amplitude is determined by the y-coordinate corresponding to the x-coordinate k according to the amplitude model.

The path comprises a coefficient of the block, known as the initial coefficient, and a list of vectors joining at least some of the other coefficients.

The path is determined so as to minimize an encoding cost of the block as a whole. The encoding cost represents a compromise between rate and distortion. The cost of encoding a signal S is the function $C(S)=R(S)+\lambda.D(S)$, in which $R(S)$ represents the rate of transmission of the encoded form of the signal S, $D(S)$ represents the distortion generated in the signal reconstructed after encoding and decoding, with respect to the original signal, and $\lambda$ is a parameter of adjustment between compression of the signal and distortion generated by the encoding.

It should be noted that the minimization of the function $C(S)$ on the signal S is equivalent to the minimization of the function $C(S)$ on each element of a partition of the signal, in particular on each sample of the signal. This is due to the fact that the distortion and the rate are respectively additive.

Thus, on the basis of a desired compromise $\lambda$, for example chosen by the user, Lagrangian optimization is performed to minimize the encoding cost.

The following step S5 is the storage in memory of the encoding cost $C_{1i}$ of the block $B_i$, encoded according to the first encoding mode.

The following step S6 is a test to determine whether the current block is the last block to process.

If the response is negative, this step is followed by the step S7 at which the parameter i is incremented by one unit in order to consider another block of the image. Step S7 is followed by the previously described step S3.

When the response is positive at step S6, the encoding costs of all the blocks of the image have been estimated for the first encoding mode. Step S6 is then followed by step S12 which is detailed in what follows.

Steps S8 to S11 concern a second encoding mode.

Step S1 is also followed by the encoding cost estimation step S8 according to a second encoding mode.

The second encoding mode is JPEG encoding. This step will be detailed below. Its result is an encoding cost $C_2=R_2+\lambda.D_2$ which is determined for the entire image.

This encoding cost is determined as a function of a quality factor Q which will be detailed in what follows.

The current encoding cost is stored in memory at step S9.

The following step S10 is a test to determine whether the current quality factor Q is optimum, that is to say whether the encoding cost $C_2$ is minimum.

Figure 4:
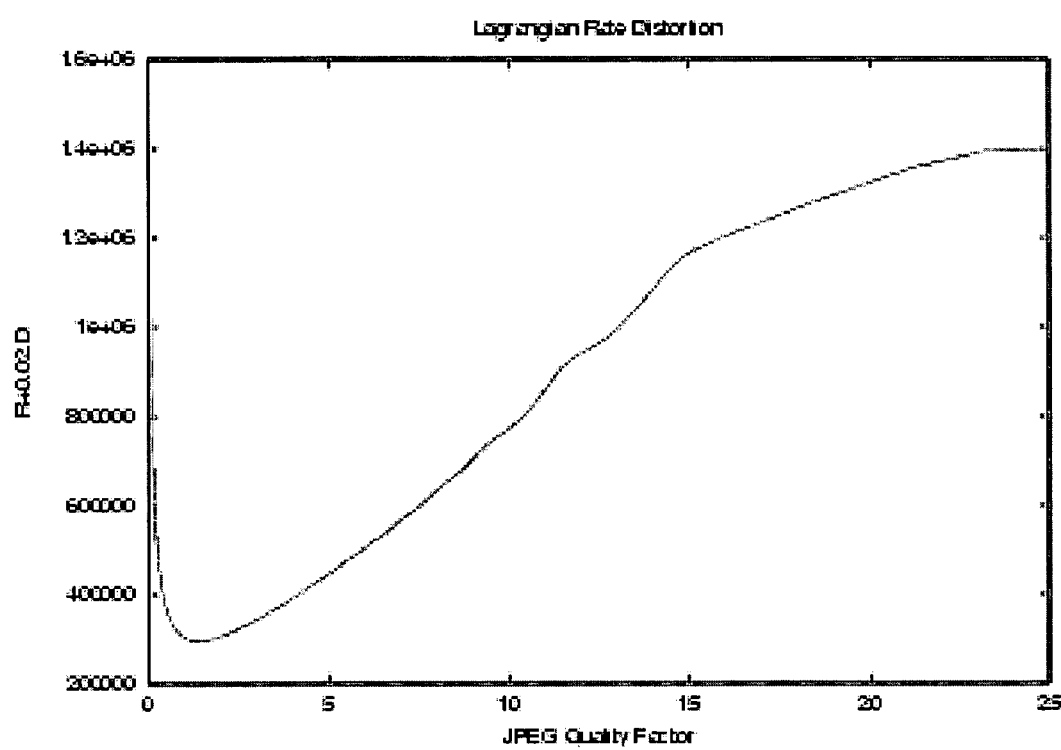
FIG. 4 represents a curve of encoding cost as a function of a quality factor.

For this, the curve of the encoding cost $C_2$ as a function of the quality factor is considered. For example, FIG. 4 represents such a curve for values of quality factor between 0.01 and 26.

So long as the minimum value of the encoding cost has not been reached, step S10 is followed by step S11 at which a following quality factor is considered. The quality factor is chosen here by dichotomy or by any optimization method with one variable for a non-linear function. Step S11 is followed by the previously described step S8.

When the minimum encoding cost has been found, step S10 is followed by the step S12 which is an initialization at which the parameter i is set to the value zero. As already stated, step S6 is also followed by the step S12 when the response to that step is positive.

The following step S13 is the selection of a block $B_i$ of the image.

The following step S14 is a test to determine what the least encoding cost is for the block $B_i$ considered.

If the least encoding cost for the block considered is the cost $C_{1i}$ corresponding to the first encoding mode, then step S14 is followed by the step S15 at which a first marker, signifying that the first encoding mode has been selected for the block under consideration, is associated with the encoding data of the current block $B_i$.

The following step S16 is the encoding of the current block $B_i$ according to the first encoding mode.

If the least encoding cost for the block considered is the cost $C_{2i}$ corresponding to the second encoding mode, then step S14 is followed by the step S17 at which a second marker, signifying that the second encoding mode has been selected for the block under consideration, is associated with the encoding data of the current block $B_i$.

The following step S18 is the encoding of the current block $B_i$ according to the second encoding mode.

The steps S16 and S18 are followed by the step S19 which is a test to determine whether the current block is the last block to process.

If the response is negative, this step is followed by the step S20 at which the parameter i is incremented by one unit in order to consider another block of the image. Step S20 is followed by the previously described step S13.

When the response is positive at step S19, all the blocks of the image have been processed and the encoding of the image is terminated.

Figure 5:
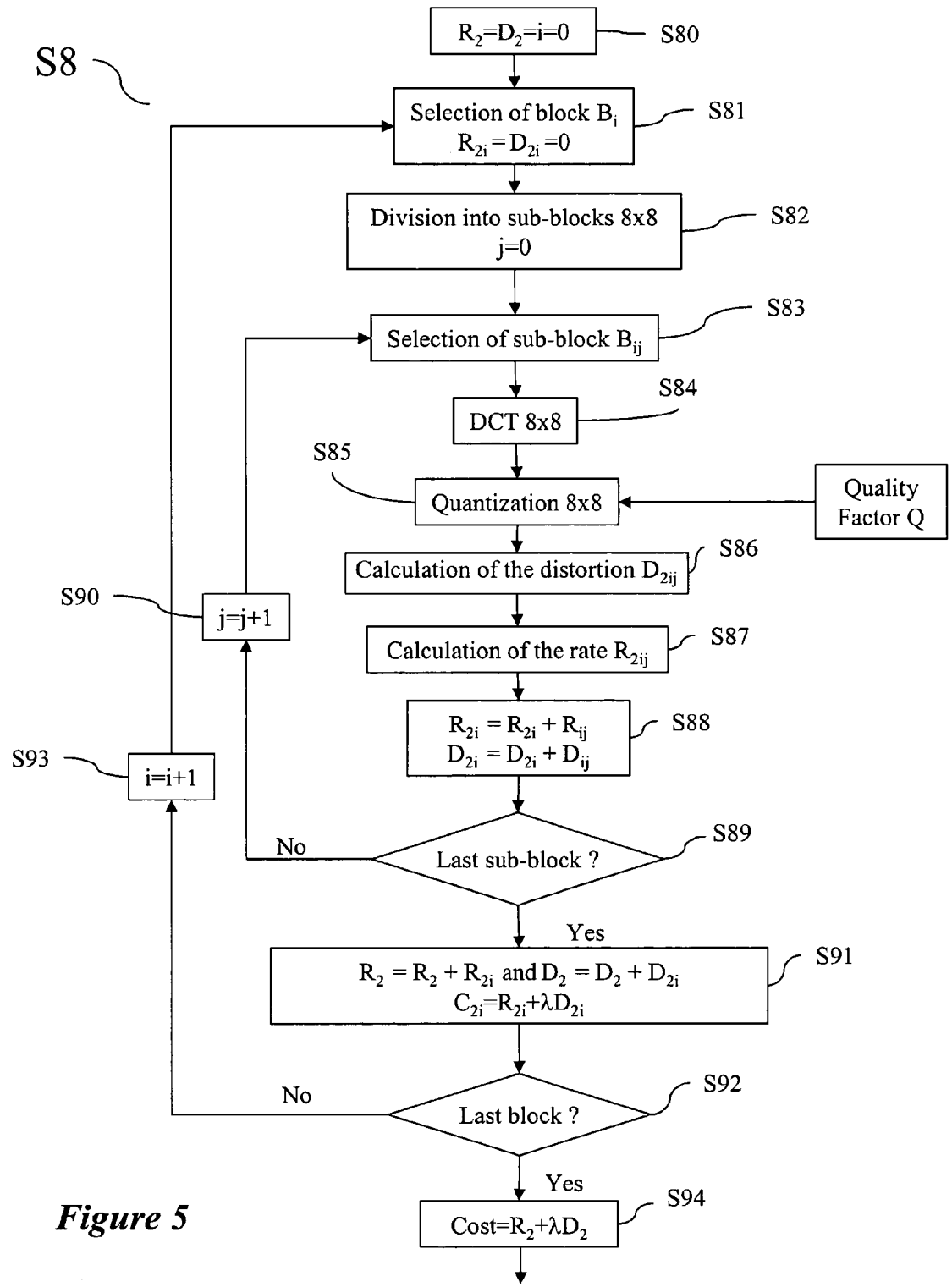
FIG. 5 represents an embodiment of encoding cost estimation according to the invention.

Step S8 is detailed in FIG. 5 in the form of an algorithm comprising steps S80 to S94.

The object of step S8 is to estimate an encoding cost using an encoding mode which does not take as input a rate-distortion compromise modeled by the Lagrangian multiplier $\lambda$. The encoding mode considered here is JPEG encoding.

Step S80 is an initialization at which the rate $R_2$ and the distortion $D_2$ corresponding to the encoding of the image by JPEG are initialized to the value zero. The parameter i, which represents the index of the block, is also initialized to the value zero.

The following step S81 is the selection of a block $B_i$ of the image to be processed. A rate $R_{2i}$ and a distortion $D_{2i}$ associated with the current block are set to the value zero.

The following step S82 is a division of the current block $B_i$ into blocks of size 8×8 coefficients, in the case in which the current block has a size greater than that value. This is because JPEG encoding is performed on blocks of size 8×8 coefficients. Preferably, the size of the blocks formed at step S1 is a multiple of 8×8. In what follows, a block of size 8×8 is termed sub-block. A parameter j is initialized to the value zero. The parameter j is an integer which represents an index of the sub-block.

The following step S83 is the selection of a sub-block $B_{ij}$ in the current block $B_i$.

At the following step S84 a discrete cosine transformation is applied to the current sub-block $B_{ij}$.

The following step S85 is a quantization of the transformed current sub-block. This quantization is carried out on the basis of a quantization matrix comprising 64 elements which represent the 64 quantization step sizes used for the 64 frequencies obtained after transformation.

The user may choose a quantization table. He may also use a predefined table and choose a multiplier coefficient of the matrix, or quality factor. It is this second case which is implemented in the preferred embodiment. The table $M_k$ defined in annex K of the ISO standard (JPEG ISO DIS 10918-1, Requirements and Guidelines), as represented in FIG. 6 is used, since it generally gives good results on natural images.

If the quality factor Q is between 0 and 1, the quantization is fine and the decoded image is of good quality. However, the compression rate is low. If the quality factor Q is greater than 1, the quantization is coarser, the compression rate is higher but the decoded image is of less good quality.

The quality factor Q chosen at step S8 (FIG. 3) thus influences the encoding cost.

The following step S86 is the calculation of the distortion $D_{2ij}$ of the current sub-block, due to the JPEG encoding.

The following step S87 is the calculation of the rate $R_{2ij}$ of the encoded data of the current sub-block, when it is JPEG encoded.

The following step S88 is the respective accumulated total of the distortion and of the rate previously calculated for the current sub-block $B_{ij}$ with the values of distortion and rate of the current block: $R_{2i}=R_{2i}+R_{2ij}$ and $D_{2i}=D_{2i}+D_{2ij}$.

The following step S89 is a test to determine whether all the sub-blocks of the current block $B_i$ have been processed. If the response is negative, this step is followed by the step S90 at which the parameter j is incremented by one unit in order to consider a following sub-block. Step S90 is followed by the previously described step S83.

When all the sub-blocks of the current block $B_i$ have been processed, step S89 is followed by the step S91 at which:

the rate calculated for the current block $B_i$ is totaled with the rates calculated for the preceding blocks: $R_2=R_2+R_{2i}$, the distortion calculated for the current block $B_i$ is totaled with the distortions calculated for the preceding blocks: $D_2=D_2+D_{2i}$, the encoding cost of the current block $B_i$ by the second encoding mode is calculated: $C_{2i}=R_{2i}+\lambda.D_{2i}$.

The following step S92 is a test to determine whether all the sub-blocks of the current block $B_i$ have been processed. If the response is negative, this step is followed by the step S93 at which the parameter i is incremented by one unit in order to consider a following block. Step S93 is followed by the previously described step S81.

When the response is positive at step S92, all the blocks of the image have been processed. Step S92 is then followed by step S94 at which the cost of encoding the image by the second encoding mode is calculated: $C_2=R_2+\lambda.D_2$ by totaling all the values of encoding cost of the blocks of the image.

Figure 7:
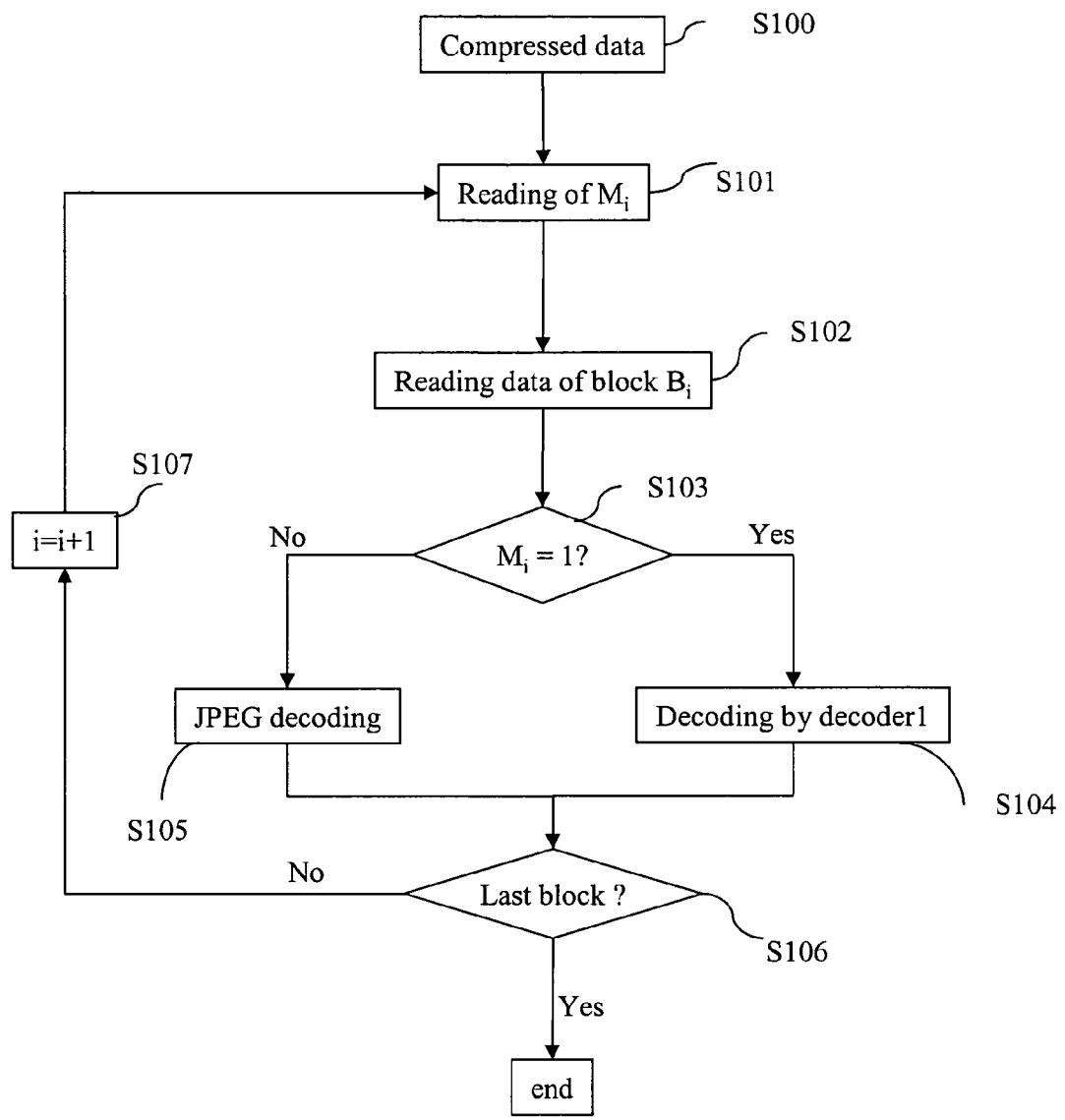
FIG. 7 represents an embodiment of a decoding method according to the invention.

FIG. 7 represents an embodiment of a method of decoding data previously encoded according to the method of FIG. 3.

This method is implemented in the decoding device and comprises steps S100 to S107.

The method is carried out in the form of an algorithm which can be stored in whole or in part in any means of information storage capable of cooperating with the microprocessor. This storage means is readable by a computer or by a microprocessor. The storage means is integrated or not into the device, and may be removable. For example, it may comprise a magnetic tape, a diskette or a CD-ROM (fixed memory compact disk).

Step S100 is the reading in memory of the encoded data of the image.

The following step S101 is the reading of a marker $M_i$ of a block $B_i$ to be decoded.

The following step S102 is the reading in memory of the encoding data of the current block $B_i$.

The following step S103 is a test to determine what encoding mode was used to encode the current block $B_i$, as a function of the value of the marker.

If the marker indicates that the first encoding mode was used, then step S103 is followed by the step S104 which is a decoding corresponding to that first mode.

This decoding is carried out as set out in the French patent application No. 01 06933.

The amplitude model is read and decoded, in order to provide the amplitudes of the coefficients. The path is read and decoded in order to provide the locations of the coefficients. The order of each coefficient in the path determines it amplitude, since the $k^{th}$ coefficient of the path receives the amplitude A(k) corresponding to the x-coordinate k according to the amplitude model.

If the marker indicates that the second encoding mode was used, then step S103 is followed by the step S105 which is a decoding according to the JPEG standard.

The steps S104 and S105 are followed by the step S106 which is a test to determine whether all the blocks have been decoded.

If the response is negative, step S106 is followed by the step S107 at which the parameter i is incremented by one unit in order to consider a following block. Step S107 is followed by the step S101 already described.

When the response is positive at step S106, the decoding of the image is terminated.

Of course, the present invention is in no way limited to the embodiments described and represented, but encompasses, on the contrary, any variant form within the capability of the person skilled in the art.

For example, according to one variant form, the image is not divided up into blocks, and a decomposition into components of colors (red, green, blue) or a decomposition into components of luminance and chrominance is used. The encoding mode is then not chosen by block, but by component.

It is also possible to combine a dividing up into blocks of the image and a decomposition into components of colors or of luminance and chrominance.

According to another variant form, the second encoding mode is not the JPEG mode. For example, the second encoding mode is the JPEG2000 mode. In this case, the parameter to optimize as a function of the rate-distortion compromise is no longer a factor of quality Q, but the rate.

The invention claimed is:

1. A method of encoding a set of data representing physical quantities using a first encoding mode and a second encoding mode, the method comprising the steps of:

dividing the set of data into a plurality of subsets, computing a plurality of encoding costs of the set of data, each one of the plurality of encoding costs being computed using the second encoding mode and a respective one of a plurality of values of a parameter of the second encoding mode, and without using the first encoding mode;

selecting a value of the parameter from the plurality of values of the parameter, wherein the selected value of the parameter corresponds to a minimum encoding cost from the computed plurality of encoding costs;

calculating, for each one of the plurality of subsets, a first encoding cost, based at least in part on a predetermined rate-distortion compromise, using the first encoding mode, and without using the second encoding mode;

calculating, for each one of the plurality of subsets, a second encoding cost, based at least in part on the predetermined rate-distortion compromise and the selected value of the parameter, using the second encoding mode, and without using the first encoding mode;

determining, for each one of the plurality of subsets, a minimum encoding cost from the first encoding cost and the second encoding cost; and selecting, for each one of the plurality of subsets, an encoding mode from the first encoding mode and the second encoding mode, the selected encoding mode corresponding to the determined minimum encoding cost, wherein one or more of said steps are performed using at least one processor.

2. A method according to claim 1, in which the first encoding mode is an encoding according to which the set of data is encoded by an amplitude curve and a path through the set of data.

3. A method according to claim 1 or 2, in which the second encoding mode is an encoding according to the JPEG standard.

4. A method according to claim 3, wherein the selected value of the parameter corresponds to a quality factor of a quantization matrix.

5. A method according to claim 1 or 2, in which the second encoding mode is an encoding according to the JPEG2000 standard.

6. A method according to claim 5, in which a rate is optimized to correspond to a desired rate-distortion compromise.

7. A method according to claim 1 or 2, in which the set of data represents a digital image.

8. A method according to claim 7, in which the plurality of subsets are blocks formed in the digital image.

9. A method according to claim 7, in which the plurality of subsets are components of colors or of luminance and chrominance.

10. A device for encoding a set of data representing physical quantities using a first encoding mode and a second encoding mode, the device comprising:
    means for dividing the set of data into a plurality of subsets;
    means for computing a plurality of encoding costs of the set of data, each one of the plurality of encoding costs being computed using the second encoding mode and a respective one of a plurality of values of a parameter of the second encoding mode, and without using the first encoding mode;
    means for selecting a value of the parameter from the plurality of values of the parameter, wherein the selected value of the parameter corresponds to a minimum encoding cost from the computed plurality of encoding costs;
    means for calculating, for each one of the plurality of subsets, a first encoding cost, based at least in part on a predetermined rate-distortion compromise, using the first encoding mode, and without using the second encoding mode;
    means for calculating, for each one of the plurality of subsets, a second encoding cost, based at least in part on the predetermined rate-distortion compromise and the selected value of the parameter, using the second encoding mode, and without using the first encoding mode;
    means for determining, for each one of the plurality of subsets, a minimum encoding cost from the first encoding cost and the second encoding cost; and
    means for selecting, for each one of the plurality of subsets, an encoding mode from the first encoding mode and the second encoding mode, the selected encoding mode corresponding to the determined minimum encoding cost.

11. A device according to claim 10, wherein the first encoding mode is an encoding according to which the set of data is encoded by an amplitude curve and a path through the set of data.

12. A device according to claim 10 or 11, wherein the second encoding mode is an encoding according to the JPEG standard.

13. A device according to claim 12, wherein the selected value of the parameter corresponds to a quality factor of a quantization matrix.

14. A device according to claim 10 or 11, wherein the second encoding mode is an encoding according to the JPEG2000 standard.

15. A device according to claim 14, adapted to optimize a rate to correspond to a desired rate-distortion compromise.

16. A device according to claim 10 or 11, adapted to process data which represents a digital image.

17. A device according to claim 16, wherein the means for dividing are adapted to form subsets which are blocks formed in the digital image.

18. A device according to claim 16, wherein the means for dividing are adapted to form subsets which are components of colors or of luminance and chrominance.

19. An encoding device according to claim 10 or 11, wherein the means for dividing, calculating and selecting are incorporated in:
    a microprocessor,
    a read only memory, comprising a program for processing the data, and
    a random access memory comprising registers adapted to record variables modified during the execution of said program.

20. An apparatus for processing a digital image, comprising the device according to claim 10 or 11.

21. An apparatus for processing a digital image, comprising at least a processor and memory that serve as means adapted to implement the method according to claim 1 or 2.

22. A computer-readable medium storing a program for implementing the method according to claim 1 or 2.

23. A computer-readable medium according to claim 22, comprising a floppy disk or a CD-ROM.

24. A computer program stored on a computer-readable medium and comprising computer-executable instructions adapted to implement the method according to claim 1, when the computer program is loaded and executed in a computer system.

25. A method of encoding a set of data representing physical quantities using a first encoding mode and a second encoding mode, the method comprising the steps of:
    dividing the set of data into a plurality of subsets;
    calculating, for each respective one of the plurality of subsets, a plurality of second encoding costs by applying the second encoding mode to the respective one of the plurality of subsets using one of a plurality of values of a parameter of the second encoding mode, and without using the first encoding mode;
    selecting one of the plurality of values of the parameter such that a sum of the plurality of second encoding costs associated with the plurality of subsets and the selected one of the plurality of values is minimized;
    calculating, for each respective one of the plurality of subsets, a first encoding cost by applying the first encoding mode to the respective one of the plurality of subsets, wherein the first encoding cost is calculated without using the second encoding mode;
    determining, for each one of the plurality of subsets, a minimum encoding cost from the first encoding cost and the second encoding cost associated with the selected one of the plurality of values of the parameter; and
    selecting, for each one of the plurality of subsets, an encoding mode from the first encoding mode and the second encoding mode, the selected encoding mode corresponding to the minimum encoding cost,
    wherein one or more of said steps are performed using at least one processor.

26. A method according to claim 25, wherein the step of selecting one of the plurality of values of the parameter further includes:

computing, for each of the plurality of values of the parameter, a sum of all of the plurality of second encoding costs and the respective one of the plurality of values of the parameter; and selecting the respective one of the plurality of values of the parameter corresponding to the minimum computed sum.

27. A device for encoding a set of data representing physical quantities using a first encoding mode and a second encoding mode, comprising:

means for dividing the set of data into a plurality of subsets;

means for calculating, for each respective one of the plurality of subsets, a plurality of second encoding costs by applying the second encoding mode to the respective one of the plurality of subsets using one of a plurality of values of a parameter, without using the first encoding mode;

means for selecting one of the plurality of values of the parameter such that a sum of the plurality of second encoding costs associated with the plurality of subsets and the selected one of the plurality of values is minimized;

means for calculating, for each respective one of the plurality of subsets, a first encoding cost by applying the first encoding mode to the respective one of the plurality of subsets, without using the second encoding mode;

means for determining, for each one of the plurality of subsets, a minimum encoding cost from the first encoding cost and the second encoding cost associated with the selected one of the plurality of values of the parameter; and means for selecting, for each one of the plurality of subsets, an encoding mode from the first encoding mode and the second encoding mode, the selected encoding mode corresponding to the minimum encoding cost.

* * * * *